United States Patent
Komatsuzaki

(10) Patent No.: US 11,928,801 B2
(45) Date of Patent: Mar. 12, 2024

(54) CHARGED PARTICLE BEAM APPARATUS

(71) Applicant: Hitachi High-Tech Corporation, Tokyo (JP)

(72) Inventor: Ryo Komatsuzaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 388 days.

(21) Appl. No.: 17/594,342

(22) PCT Filed: Apr. 18, 2019

(86) PCT No.: PCT/JP2019/016720
§ 371 (c)(1),
(2) Date: Oct. 12, 2021

(87) PCT Pub. No.: WO2020/213145
PCT Pub. Date: Oct. 22, 2020

(65) Prior Publication Data
US 2022/0261973 A1    Aug. 18, 2022

(51) Int. Cl.
*G06K 9/00* (2022.01)
*G06T 5/00* (2006.01)
(Continued)

(52) U.S. Cl.
CPC ............ *G06T 5/50* (2013.01); *G06T 5/002* (2013.01); *G06V 10/764* (2022.01); *G06T 2200/24* (2013.01); *G06T 2207/20092* (2013.01)

(58) Field of Classification Search
CPC ....... G06T 5/002; G06T 5/50; G06T 2200/24; G06T 2207/20092; G06V 10/82;
(Continued)

(56) References Cited

U.S. PATENT DOCUMENTS 7,642,514 B2 * 1/2010 Takane .................. G06T 5/003
250/307
8,126,197 B2 * 2/2012 Jones ................... G06V 10/993
382/100
(Continued)

FOREIGN PATENT DOCUMENTS

JP    2000-294185 A    10/2000
JP    2001-256480 A    9/2001
(Continued)

OTHER PUBLICATIONS

International Search Report (PCT/ISA/210) issued in PCT Application No. PCT/JP2019/016720 dated Jul. 16, 2019 with English translation (four (4) pages).
(Continued)

*Primary Examiner* — Shervin K Nakhjavan
(74) *Attorney, Agent, or Firm* — Crowell & Moring LLP

(57) ABSTRACT

With respect to a charged particle beam apparatus, provided is a technology capable of preventing a deterioration in image quality of a captured image. The charged particle beam apparatus includes an imaging device that irradiates a sample with a charged particle beam and forms an image from information of the sample and a computer. The computer stores each of images (scanned images) obtained by scanning the same area multiple times, classifies each of images into an image including a deteriorated image and an image not including the deteriorated image, and stores a target image obtained by performing image integration from the image not including the deteriorated image. The charged particle beam apparatus includes a database that stores data such as information obtained from an imaging device including the scanned image, classification results, and the target image. The charged particle beam apparatus obtains a target image having a high S/N and sharpness in which random noise is suppressed and a deterioration in image
(Continued)

quality is prevented by performing the image integration on the scanned image that does not include the selected deteriorated image among the scanned images.

6 Claims, 10 Drawing Sheets

(51) Int. Cl.
  *G06T 5/50* (2006.01)
  *G06V 10/764* (2022.01)
(58) Field of Classification Search
  CPC .... G06V 10/77; G06V 10/764; G06V 10/763; G01N 2223/07; G01N 2223/401; G01N 23/225; H01J 2237/221; H01J 37/222; H01J 37/244; H01J 37/28; G06F 18/23213
  See application file for complete search history.

(56) References Cited

U.S. PATENT DOCUMENTS

| | | | | |
|---|---|---|---|---|
| 9,305,343 | B2* | 4/2016 | Nakahira | G06T 7/0004 |
| 10,169,852 | B1* | 1/2019 | Putman | G06T 3/4038 |
| 10,169,873 | B2* | 1/2019 | Gur | G06N 3/08 |
| 2003/0111602 | A1 | 6/2003 | Sato et al. | |
| 2005/0236570 | A1* | 10/2005 | Morokuma | H01J 37/153 |
| | | | | 250/311 |
| 2009/0112644 | A1 | 4/2009 | Isom et al. | |
| 2011/0187847 | A1* | 8/2011 | Bai | H01J 37/222 |
| | | | | 348/80 |
| 2015/0002652 | A1* | 1/2015 | Takasugi | G01B 15/00 |
| | | | | 348/80 |
| 2016/0276128 | A1 | 9/2016 | Ikeda et al. | |
| 2018/0301316 | A1 | 10/2018 | Kamio et al. | |
| 2022/0351359 | A1* | 11/2022 | Zhang | G03F 7/70616 |

FOREIGN PATENT DOCUMENTS

| | | | | |
|---|---|---|---|---|
| JP | 2008-124625 A | | 5/2008 | |
| JP | 4301385 B2 * | | 7/2009 | G01B 15/00 |
| JP | 4301385 B2 | | 7/2009 | |
| JP | 2015-94973 A | | 5/2015 | |
| JP | 2016-178037 A | | 10/2016 | |
| JP | 2019-8599 A | | 1/2019 | |
| WO | WO 03/044821 A1 | | 5/2005 | |
| WO | WO 2017/090204 A1 | | 6/2017 | |

OTHER PUBLICATIONS

Japanese-language Written Opinion (PCT/ISA/237) issued in PCT Application No. PCT/JP2019/016720 dated Jul. 16, 2019 (eight (8) pages).

International Preliminary Report on Patentability (PCT/EPEA/409) issued in PCT Application No. PCT/JP2019/016720 dated Mar. 17, 2020, including Annexes with partial English translation (15 pages).

* cited by examiner

[FIG. 1]
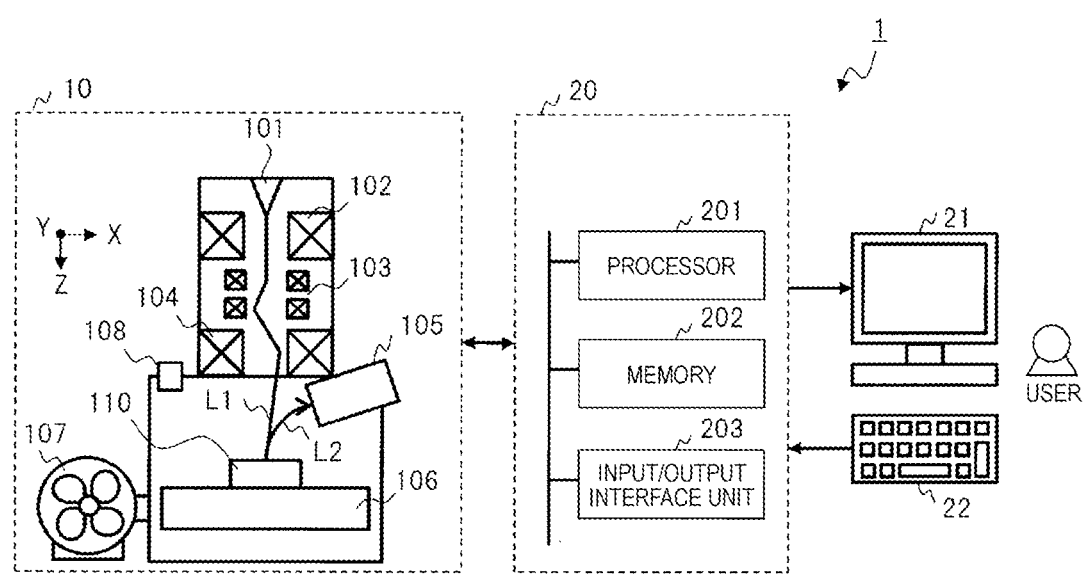

[FIG. 2]
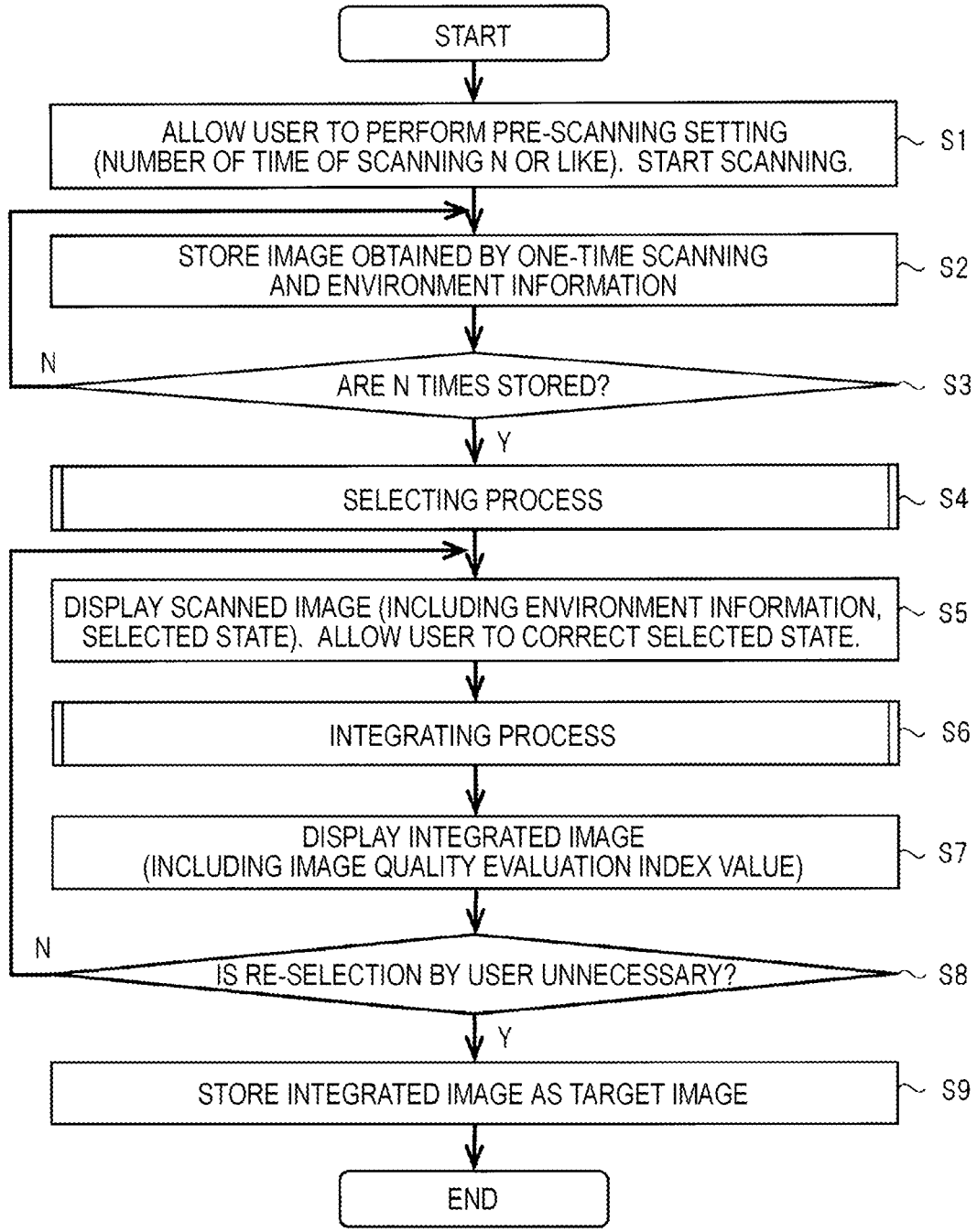

[FIG. 3]
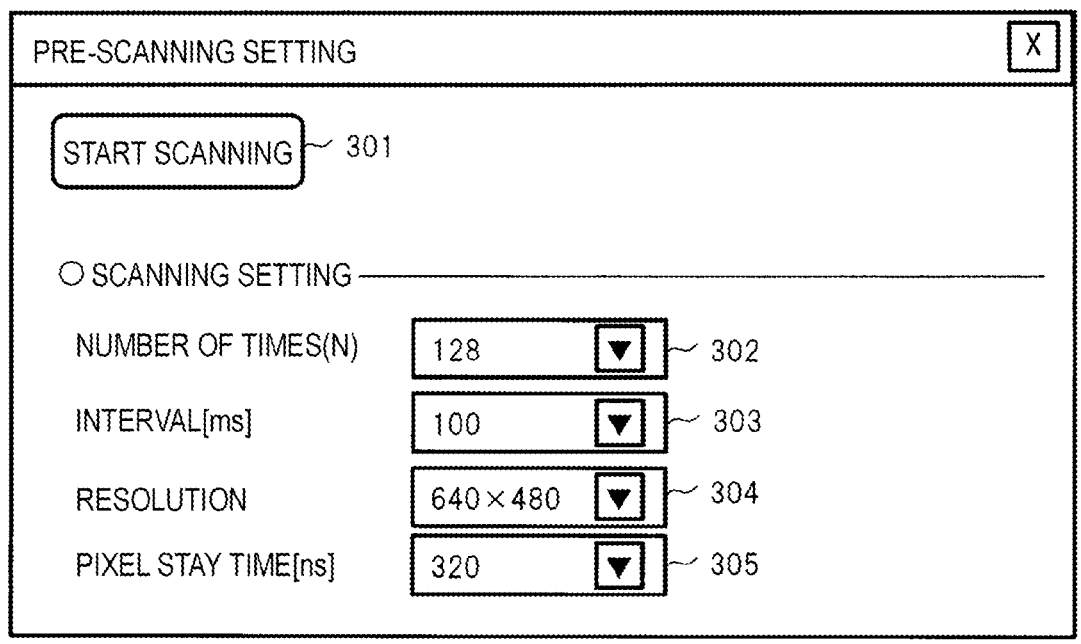

[FIG. 4]
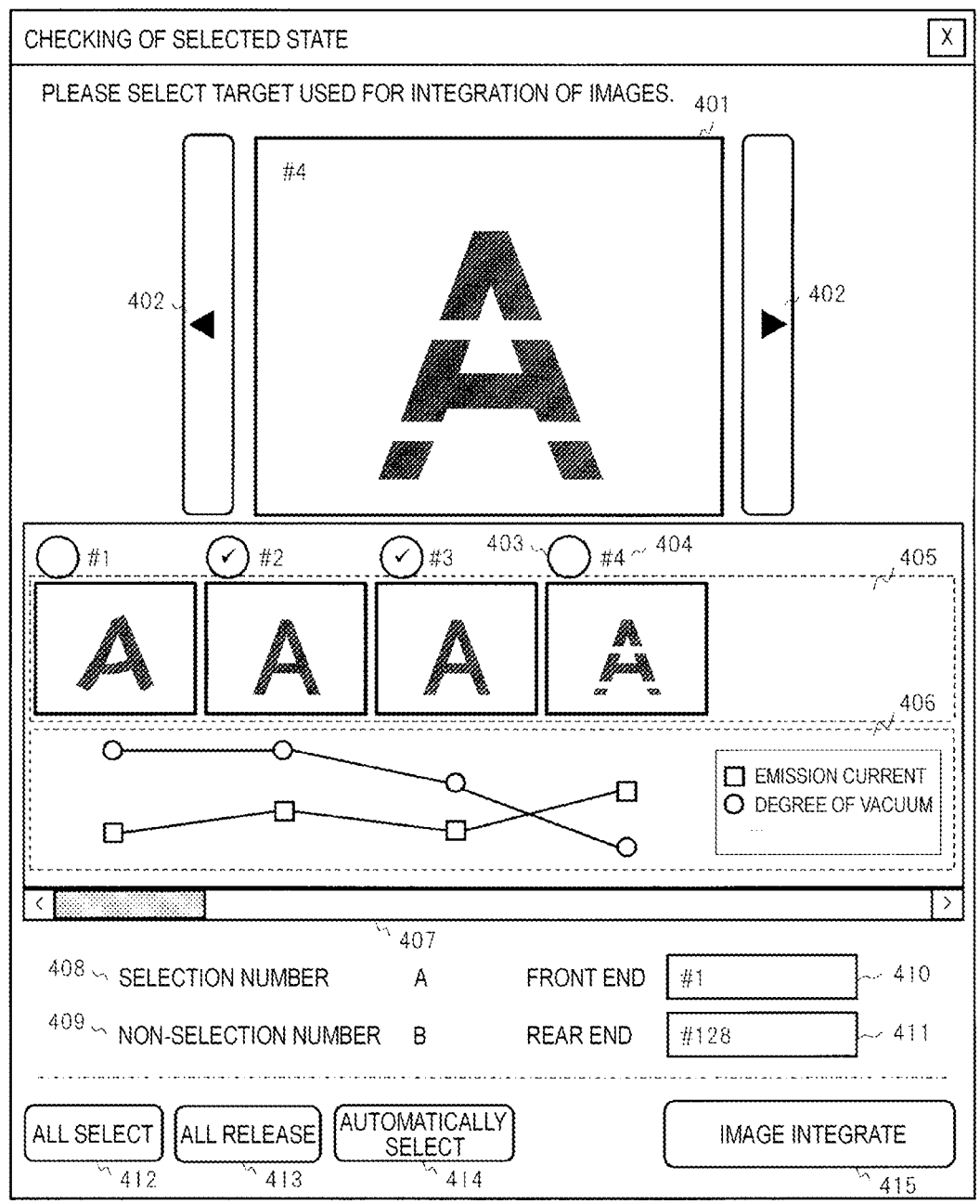

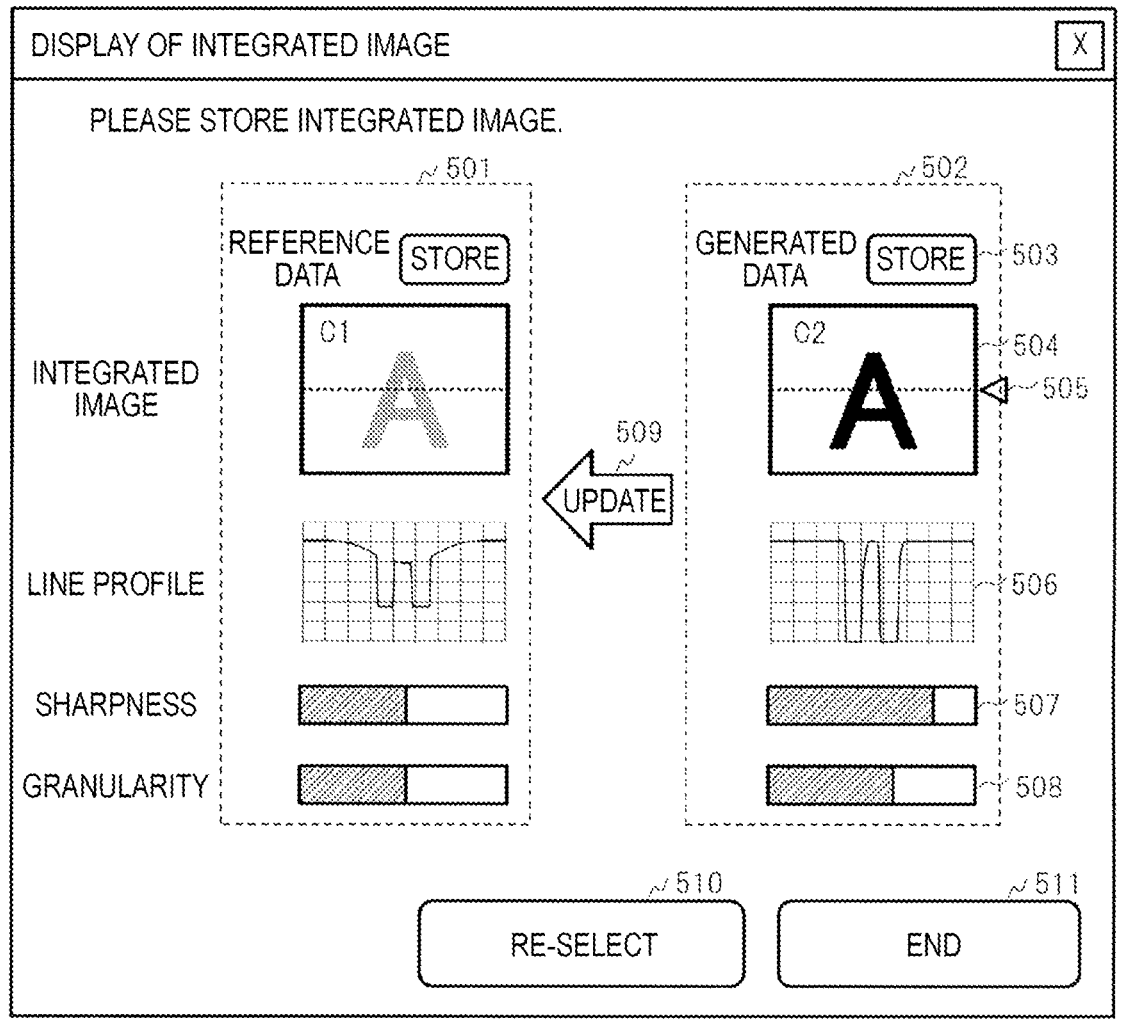
[FIG. 5]

[FIG. 6]

610 SCANNED IMAGE DB

| SCANNED IMAGE ID | NUMBER | IMAGE FILE (PATH) | IMAGING TIMING [ms] | PROBE CURRENT [mA] | DEGREE OF VACUUM [Pa] | ... |
|---|---|---|---|---|---|---|
| A1 | 1 | f1 (...¥A1¥001.bmp) | 0.0 | 5.36 | $1 \times 10^{-5}$ | ... |
| | 2 | f2 (...¥A1¥002.bmp) | 0.1 | 5.35 | $1 \times 10^{-5}$ | ... |
| | 3 | f3 (...¥A1¥003.bmp) | 0.2 | 5.36 | $1 \times 10^{-5}$ | ... |
| | ...... | ...... | ...... | ...... | ...... | ... |
| | N | fN (...¥A1¥00N.bmp) | $0.1 \times (N-1)$ | 4.96 | $2 \times 10^{-5}$ | ... |
| A2 | 1 | f5 (...¥A2¥001.bmp) | 0.0 | 4.96 | $2 \times 10^{-5}$ | ... |
| | ...... | ...... | ...... | ...... | ...... | ... |

620 SELECTED STATE DB

| SELECTED STATE ID | SCANNED IMAGE ID | NUMBER | SELECTED STATE |
|---|---|---|---|
| B1 | A1 | 1 | 0 |
| | | 2 | 1 |
| | | 3 | 1 |
| | | ...... | ... |
| | | N | 0 |
| B2 | A1 | 1 | 1 |
| | | ...... | ... |

630 INTEGRATED IMAGE DB

| INTEGRATED IMAGE ID | SELECTED STATE ID | IMAGE FILE (PATH) | LINE PROFILE (PATH) | SHARPNESS | GRANULARITY | ... |
|---|---|---|---|---|---|---|
| C1 | B1 | C1 (...¥C1¥001.bmp) | L1 (...¥C1¥001.csv) | 0.6 | 0.8 | ... |
| C2 | B2 | C2 (...¥C2¥001.bmp) | L2 (...¥C2¥001.csv) | 0.7 | 0.5 | ... |
| C3 | B1 | C3 (...¥C3¥001.bmp) | L3 (...¥C3¥001.csv) | 0.6 | 0.8 | ... |
| ...... | ...... | ...... | ...... | ...... | ...... | ... |

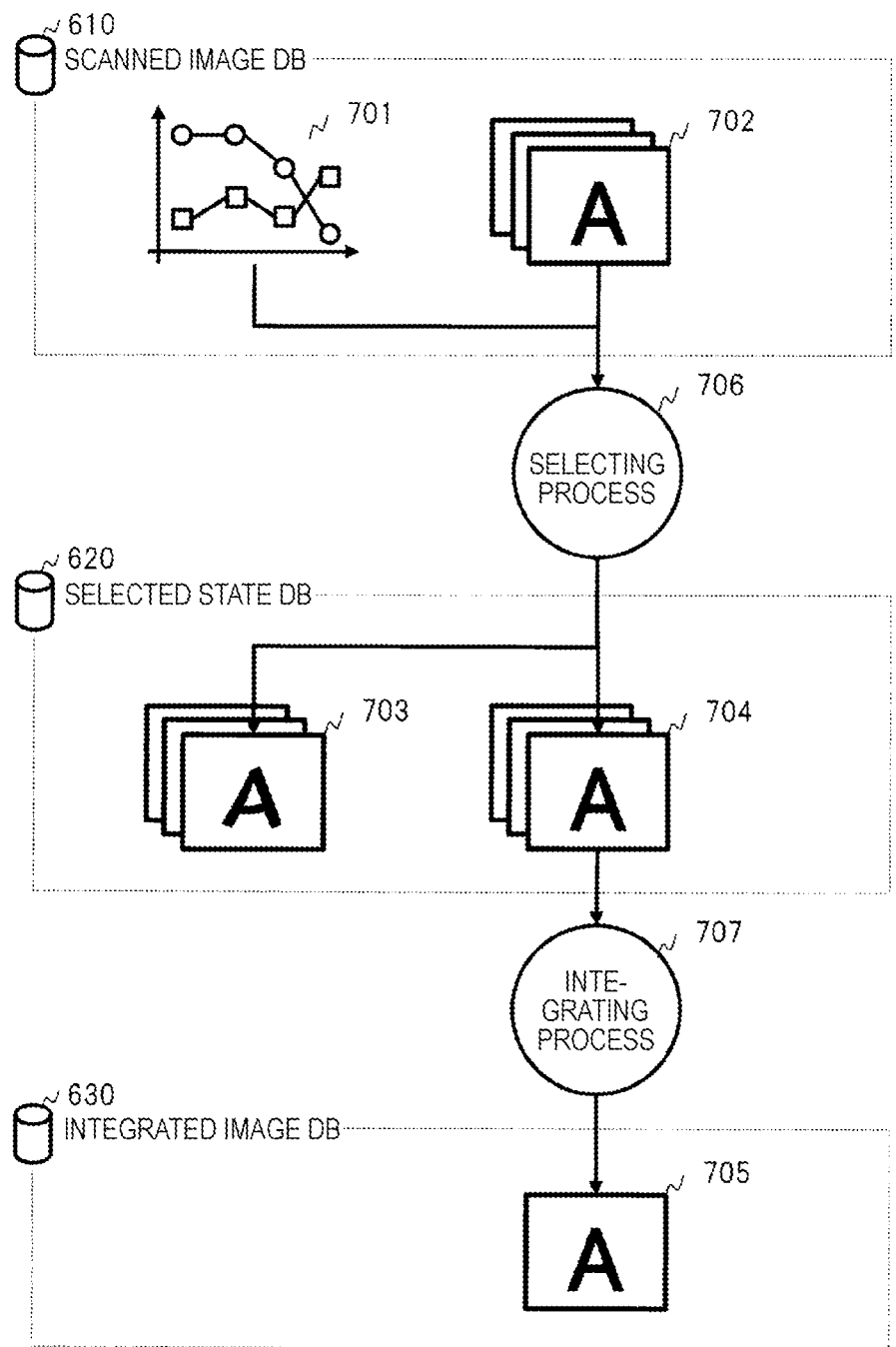
[FIG. 7]

[FIG. 9]
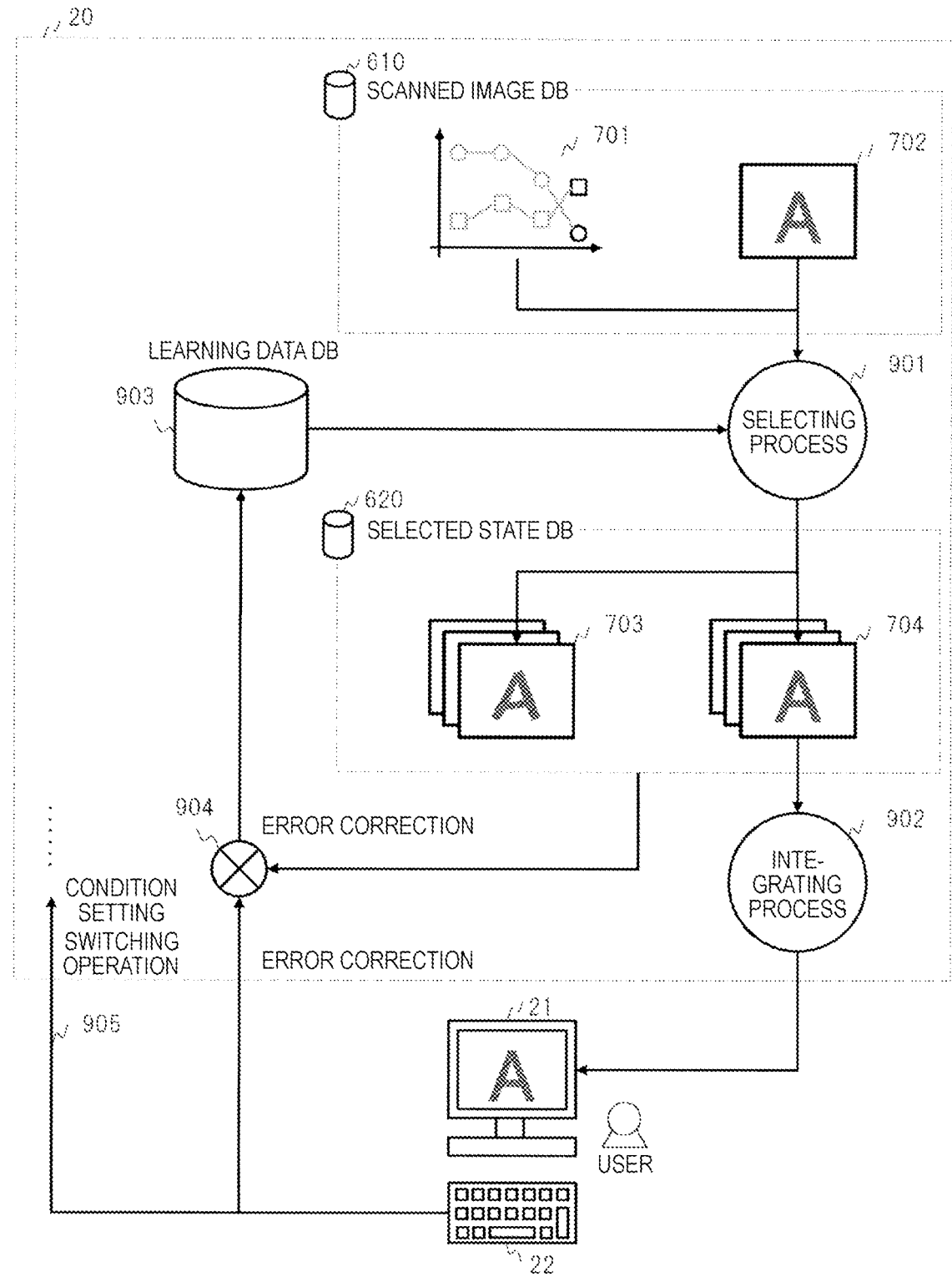

[FIG. 10]
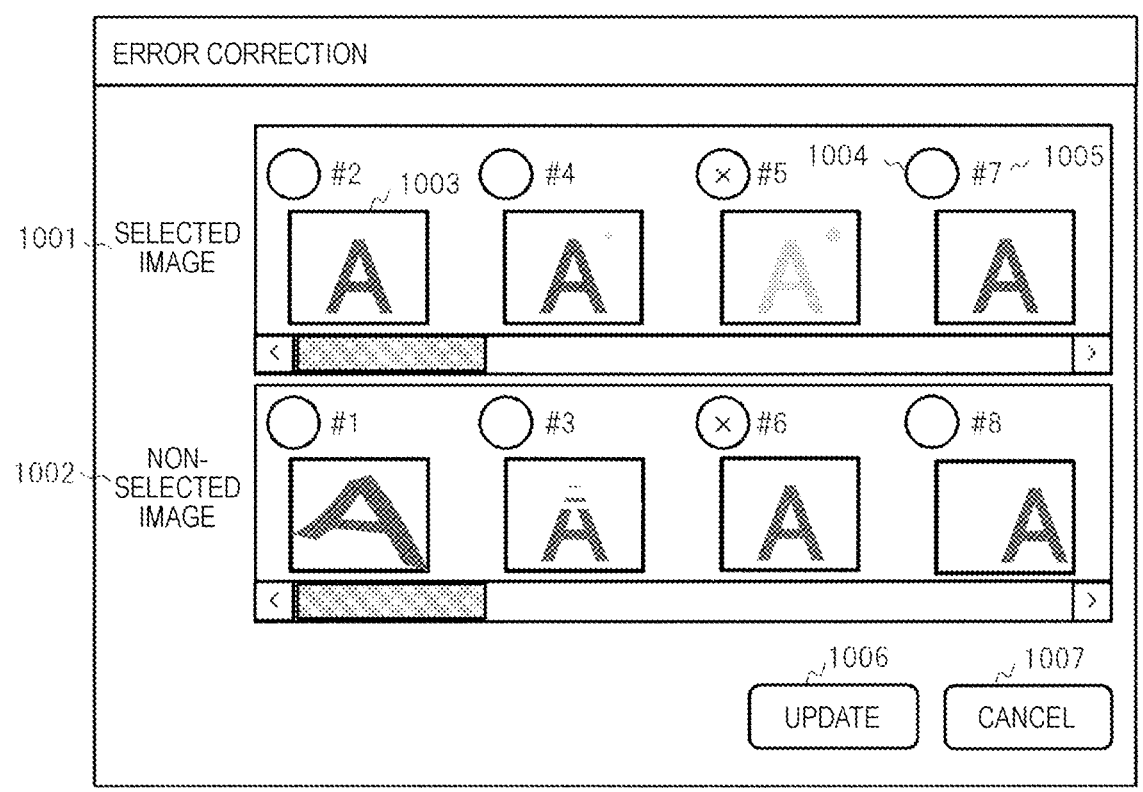

CHARGED PARTICLE BEAM APPARATUS

TECHNICAL FIELD

The present invention relates to a technique of a charged particle beam apparatus and to an imaging technique.

BACKGROUND ART

As a charged particle beam apparatus, there are exemplified a scanning electron microscope (SEM) and a focused ion beam (FIB) device. The charged particle beam apparatus observes and analyzes a sample by irradiating the target sample with a charged particle beam. For example, a scanning electron microscope is a device that uses an electron beam as the charged particle beam and forms an image from detection signals such as secondary electrons and reflected electrons generated by scanning the sample with a finely focused electron beam (probe).

The detection signal (for example, the signal after collecting and amplifying the secondary electrons emitted from the irradiation surface of the sample) used for imaging in the charged particle beam apparatus has a large noise component due to the characteristics thereof. For this reason, there is known a technique of integrating a plurality of images in the same area to suppress irregularly generated noise (random noise). WO-A-2017/090204 (PTL 1) is mentioned as an example of the related art. PTL 1 describes that, in order to eliminate discomfort in the integrating process of suppressing the random noise, a grayscale value of the integrated image is normalized to perform normalized integration that maintains brightness of a field of view being observed.

CITATION LIST

Patent Literature

PTL 1: WO-A-2017/090204
PTL 2: JP-B-4301385

SUMMARY OF INVENTION

Technical Problem

Generally, in imaging (recording an image on a recording medium) of the SEM, it is possible to obtain a target image in which random noise is suppressed by integrating each of images (sometimes referred to as scanned images) obtained by scanning the same area multiple times. Since the time for scanning multiple times contributes to the amount of detection signals, the dynamic range is wide, and thus, it takes several tens of milliseconds to several hundreds of seconds. Unless both the SEM and the target sample are maintained in a stable state with a high accuracy during the generation of the integrated image, a deterioration in image quality of the target image with respect to sharpness occurs.

However, both the SEM and the target sample are alienated due to the state transition of the sample according to the beam irradiation or due to the disturbance under the installation environment. For example, in the case of the state transition of the sample according to the beam irradiation, electrons and gas molecules are collected due to charge-up (charging) and contamination, which hinders beam irradiation. In the case of disturbance under the installation environment, the disturbance (vibration of the installation environment including sound waves and electromagnetic waves) is transmitted to a lens barrel and a stage, and the position of a probe that scans the sample shifts. In addition, due to thermal drift and stage drift, the position of the field of view moves with each scanning. Due to a decrease in probe current, the signal amount of the secondary electrons decreases. Due to a decrease in a degree of vacuum, the probe is scattered by colliding with the gas present in the atmosphere. Various phenomena as described above can occur.

In order to obtain the target image with good image quality, the user who is an operator searches for imaging conditions of the charged particle beam apparatus in which factors of the deterioration in image quality are unlikely to appear by trial and error. This trial and error may take more operation time than expected and cause the sample to be damaged and the throughput to be reduced.

In the integrated image obtained by integrating the scanned images including the images affected by these phenomena, the random noise is suppressed, but the image quality with respect to the sharpness is deteriorated. JP-B-4301385 (PTL 2) describes that a position matched between a certain image sequentially acquired from the same field of view and the next image is calculated, and the integrating is performed at the calculated position. This technique is effective in preventing a deterioration in image quality of the integrated image due to a drift of each image. However, this technique is not effective in preventing the deterioration in image quality of the integrated image due to a minute drift generated in one image.

Hereinafter, these factors that deteriorate the image quality of the integrated image are referred to as image quality deterioration factors. In addition, an image affected by the image quality deterioration factors is called a deteriorated image.

An object of the present invention is to prevent a deterioration in image quality with respect to sharpness due to the image quality deterioration factors while suppressing random noise by integrating with respect to a target image captured by a charged particle beam apparatus. In addition, an object of the present invention is to capture the target image having high S/N and sharpness. Problems, configurations, effects, and the like other than the above will be clarified in the description of the embodiment for carrying out the invention.

Solution to Problem

A typical embodiment of the present invention has the following configurations. According to one embodiment, there is provided a charged particle beam apparatus including: an imaging device that irradiates a sample with a charged particle beam and forms an image from information of the sample; and a computer that is provided with a memory for storing each of images (scanned images) obtained by scanning same area multiple times by using the imaging device and a processor for executing image processing, wherein the computer classifies each of images obtained by scanning the same area multiple times into a first image including a deteriorated image and a second image not including the deteriorated image, performs image integration on the second image not including the deteriorated image, and stores a third image obtained by the image integration as a target image.

In addition, the charged particle beam apparatus includes a database (DB), and the database stores data including each of the images, information (including environment information) obtained from the imaging device with each of the images, selected states related to the classification of each of the images, and the third image.

The computer performs a selecting process including the classification, storing data in the database, and the like. Alternatively, the database maybe distributed to external devices connected to the computer.

The user who is an operator can correct a result of the selecting process. The user needs to check the result of the selecting process, especially when the image quality deterioration factor occurs. Among the image quality deterioration factors, the occurrence of factors can be specified from the transition of environment information. For this reason, the computer displays the scanned images, the graph of the environment information, and the result (selected state) of the selecting process on a screen in association with each other. Items displayed in the graph are preferably items that allow the user to determine a deteriorated image. Examples of the items include imaging timing, a probe current, and a degree of vacuum.

The user can check whether or not the image quality of the target image captured by the charged particle beam apparatus is deteriorated. Since it is difficult to visually determine the deterioration in image quality, the computer calculates an image quality evaluation index value of the target image and displays the target image and the image quality evaluation index value side by side on the screen. The image evaluation value maybe displayed as a graph. Hereinafter, the value obtained based on an objective evaluation method used for evaluating the image quality is referred to as an image quality evaluation index value.

Advantageous Effects of Invention

According to a typical embodiment of the present invention, it is possible to prevent a deterioration in image quality and to improve the image quality with respect to sharpness due to the image quality deterioration factors while suppressing random noise by integrating with respect to a target image captured by a charged particle beam apparatus. In addition, according to a typical embodiment of the present invention, it is possible to capture the target image having high S/N and sharpness. Furthermore, a typical embodiment of the present invention can contribute to suppression of the damage of the sample and the reduction of throughput due to the search for imaging conditions by the operator during observation.

BRIEF DESCRIPTION OF DRAWINGS

FIG. 1 is a diagram illustrating a configuration of a charged particle beam apparatus according to a first embodiment of the present invention.

FIG. 2 is a diagram illustrating a processing flow of an imaging function for preventing the deterioration in image quality including selecting process in the charged particle beam apparatus of the first embodiment.

FIG. 3 is a diagram illustrating an example of a screen displayed on a display device as a user interface for pre-scanning setting in the charged particle beam apparatus of the first embodiment.

FIG. 4 is a diagram illustrating an example of a screen displayed on the display device as the user interface for displaying a scanned image in the charged particle beam apparatus of the first embodiment.

FIG. 5 is a diagram illustrating an example of a screen displayed on the display device as the user interface for displaying an integrated image in the charged particle beam apparatus of the first embodiment.

FIG. 6 is a diagram illustrating a configuration example of a database in the first embodiment.

FIG. 7 is a diagram illustrating a data flow of an imaging function for preventing the deterioration in image quality in the charged particle beam apparatus of the first embodiment.

FIG. 9 is a diagram illustrating a data flow of an observation function for preventing the deterioration in image quality in a charged particle beam apparatus according to a second embodiment of the present invention.

FIG. 10 is a diagram illustrating an example of a screen displayed on a display device as a user interface for error correction in the charged particle beam apparatus of the second embodiment.

DESCRIPTION OF EMBODIMENTS

Figure 8A:
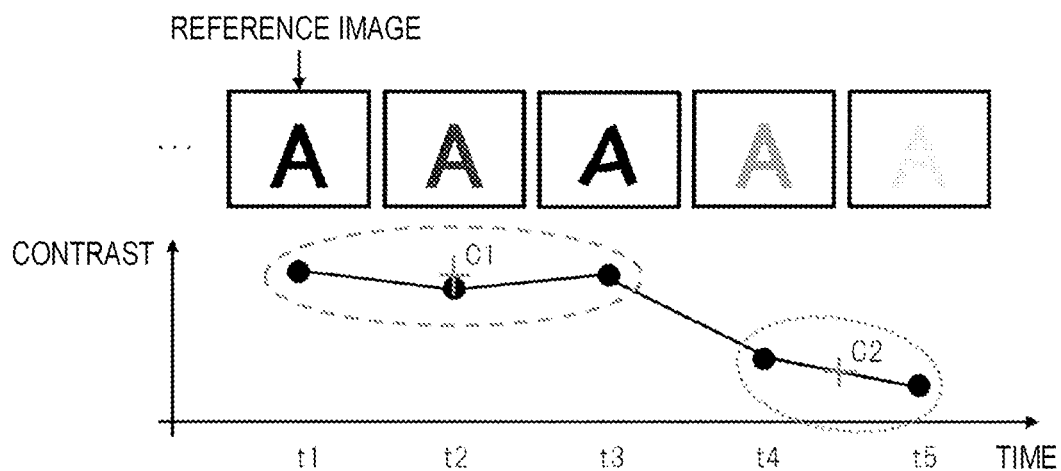
FIGS. 8A and 8B are diagrams illustrating an example of classification by feature quantity and machine learning for the selecting process in the charged particle beam apparatus of the first embodiment.

Hereinafter, embodiments of the present invention will be described in detail with reference to the drawings. It is noted that, in principle, the same components are denoted by the same reference numerals in all the drawings, and redundant description will be omitted.

First Embodiment

A charged particle beam apparatus according to a first embodiment of the present invention will be described with reference to FIGS. 1 to 8.

Charged Particle Beam Apparatus

FIG. 1 illustrates a configuration of a charged particle beam apparatus 1 of the first embodiment. The charged particle beam apparatus 1 illustrates a case of an SEM. The charged particle beam apparatus 1 is configured with an imaging device 10, a computer 20, a display device 21, an operating device 22, and the like. An operator who is a user operates the charged particle beam apparatus 1 through the display device 21, the operating device 22, and the like. The user can observe, for example, a shape and structure of a surface of a sample 110 on a screen of the display device 21.

The imaging device 10 is a main body of the SEM, and a configuration according to a known technique can be applied. In the configuration example of FIG. 1, the imaging device 10 includes an electron gun 101, a condenser lens 102, a deflection coil 103, an objective lens 104, a detector 105, a stage 106 of a sample chamber, a vacuum pump 107, an environmental sensor 108, and the like.

The sample chamber is evacuated by the vacuum pump 107. The environmental sensor 108 is a sensor group that measures a state in the sample chamber such as a degree of vacuum, temperature, vibration, and electromagnetic waves and is used for checking a degree of ultimate vacuum in the sample chamber. The sample 110 is arranged on the stage 106. The stage 106 can move in at least two directions (X direction and Y direction in the figure) in a plane perpendicular to a charged particle beam L1, and the position of the field of view can be moved. The electron gun 101 generates the charged particle beam L1 and irradiates with the charged particle beam L1 in the vertical direction (Z direction in the figure). The condenser lens 102 and the objective lens 104 condense the charged particle beam L1. The deflection coil 103 deflects the charged particle beam L1 in the X and Y directions illustrated in the figure to implement scanning of the surface of the sample 110 with the charged particle beam L1. The detector 105 detects a signal of secondary electrons L2 from the sample 110, amplifies the signal with a signal amplifier, and after that, transfers the signal to the computer 20.

The computer 20 is a control device of the SEM and controls driving and the like for each component of the imaging device 10. The computer 20 includes a processor 201, a memory 202, an input/output interface unit 203, and the like, and these are connected to a bus.

The display device 21, the operating device 22, and the like are connected to the input/output interface unit 203. The computer 20 displays a graphical user interface (GUI) for using the functions of the SEM on the screen of the display device 21. The charged particle beam apparatus 1 receives an input operation of the user through the operating device 22. The operating device 22 includes a keyboard, a mouse, and the like.

Each time a signal is transferred from the imaging device 10 to the input/output interface unit 203, the processor 201 forms a two-dimensional image in the memory 202. The charged particle beam apparatus 1 has an observation function of displaying the latest two-dimensional image (sometimes, referred to as an observed image) on the GUI. In addition, the processor 201 sets conditions suitable for storing a target image in the imaging device 10 and performs image processing, information addition, and the like. The charged particle beam apparatus 1 has an imaging function of storing the target image obtained in this manner in the memory 202 (storage medium).

It is noted that the present invention is not limited to the above-described configuration, but a configuration may be used in which other devices such as external storages or servers are connected to the input/output interface unit 203 by communication, and each computer resource is used to perform calculation, control, data storage, and the like. In addition, a plurality of the users and a plurality of the display devices 21 may exist.

Processing Flow

FIG. 2 illustrates a processing flow of the imaging function for preventing the deterioration in image quality including a selecting process by the computer 20 of the charged particle beam apparatus 1 of the first embodiment, and includes steps S1 to S9. Hereinafter, the steps will be described in order.

In step S1, the computer 20 receives pre-scanning setting in advance based on the operation of the user. For example, the GUI illustrated in FIG. 3 described later is used for this setting. A default setting value maybe used for this setting. The setting includes setting of the number of times of scanning N for obtaining a scanned image. The charged particle beam apparatus 1 starts scanning according to instruction of the user. The computer 20 controls scanning of the imaging device 10 according to the pre-scanning setting. Furthermore, items that need to be set in the imaging device 10 before the scanning are set in step S1. In this setting, it can be designated that, for example, skipping of steps S5 and S7 described later can be set, and the user who is the operator does not intervene from the start of scanning until the target image is stored.

In step S2, the computer 20 stores the image and the environment information obtained in one-time scanning. The imaging device 10 of FIG. 1 scans the surface of the sample 110 with the charged particle beam L1 under the control of the computer 20, and the signal obtained by the detector 105 is transferred to the computer 20. The processor 201 constitutes a two-dimensional image each time the signal is transferred and stores the two-dimensional image in the memory 202. The processor 201 generates a database (scanned image DB of FIG. 6 described later) by associating the scanned image with management information such as an ID and the environment information obtained from the imaging device 10 and stores the database in the memory 202.

In step S3, the computer 20 determines the end of scanning of the charged particle beam L1 based on the number of times of scanning N. The computer 20 determines whether the number of times of execution of step S2 has reached N times. If it is determined that the number of times of execution has reached N times (Y), the process proceeds to step S4, and the scanning of the imaging device 10 is ended. If it is determined that the number of times of execution has not reached N times (N), the process returns to step S2, and the scanning of the imaging device 10 is continued.

In step S4, the computer 20 classifies the scanned images into the scanned images containing the deteriorated image and the scanned images not including the deteriorated image by executing the selecting process. The processor 201 executes the selecting process on the scanned image obtained in step S2 by referring to the scanned image DB. The result of the selecting process is stored in the memory 202 as a database (selected state DB in FIG. 6 described later) by associating the result of the selecting process with the management information such as ID. Specific examples of the selecting process will be described in [Data Flow in Imaging Function] described later.

In step S5, the computer 20 displays results obtained in steps S2 to S4 on the display device 21. The result herein mainly indicates the scanned image, the environment information during the scanning, and the selected state which is the output of the selecting process and can be obtained by referring to the scanned image DB and the selected state DB. In this display, for example, the GUI of FIG. 4 described later is used.

In addition, when there is an inappropriate item among the selected states determined by the selecting process in step S4, the user who is the operator can input a correction to the GUI through the operation device 22. The computer 20 updates the selected state DB in response to the input of the correction.

In step S6, the computer 20 obtains the integrated image in which random noise is suppressed by executing the integrating process. The processor 201 executes the integrating process on the image of which the selected state is selected by referring to the selected state DB. The result of the integrating process is stored in the memory 202 as a database (integrated image DB in FIG. 6 described later) by associating the result of the integrating process with the management information such as ID and the image quality evaluation index value for evaluating the integrated image. The image quality evaluation index values are, for example, a line profile, sharpness, and granularity, and the processor 201 executes the image processing to obtain each image quality evaluation index value of the integrated image. Specific examples of the integrating process will be described in [Data Flow in Imaging Function] described later.

In step S7, the computer 20 displays the result obtained in step S6 on the display device 21. The result herein mainly indicates the integrated image which is the output of the integrating process and the image quality evaluation index values for evaluating the integrated image and can be obtained by referring to the integrated image DB. In this display, for example, the GUI of FIG. 5 described later is used.

In step S8, the computer 20 receives an input as to whether or not the user who is the operator is satisfied with the result obtained in step S6. In other words, step S8 is a checking as to whether re-selection by the user is unnecessary. The result herein is displayed on the display device 21 in step S7. If the user is satisfied (Y), the process proceeds to step S9, and if the user is not satisfied (N), the process returns to step S5, and the selected state can be corrected again. In this display, for example, the GUI of FIG. 5 described later is used.

In step S9, the computer 20 records the integrated image obtained in step S6 as a target image on the recording medium and ends a series of processing flows. The target image can be stored in a location and a name arbitrarily designated by the user. As a recording medium, for example, there is the memory 202 built in the computer 20. Alternatively, the target image can be recorded in an external storage (DVD, a flash memory, or the like) or a storage on the network through the input/output interface unit 203. It is noted that, the charged particle beam apparatus 1 adds information associated with the integrated image DB so as to ensure traceability with respect to the data to be recorded (the information includes information on the scanned image DB and the selected state DB as necessary).

GUI in Imaging Function

FIG. 3 is an example of a screen displayed on the display device 21 as a user interface for pre-scanning setting of the charged particle beam apparatus 1 of the first embodiment. The "pre-scanning setting" screen has a number-of-times setting portion 302, an interval setting portion 303, a resolution setting portion 304, and a pixel stay time setting portion 305 as "scanning setting" items (corresponding each of the setting portions).

The scanning start button 301 is a button that allows the user to instruct the scanning start. By pressing the scanning start button 301, the charged particle beam apparatus 1 controls the imaging device 10 so as to be in the pre-scanning setting, and the process proceeds from step S1 to step S2. In addition, when the step S4 is ended, the charged particle beam apparatus 1 displays the screen of FIG. 4.

The number-of-times setting portion 302 is an item that can designate the number of times of scanning for obtaining the scanned image. The N set by the number-of-times setting portion 302 is the N used for the determination in step S3. The interval setting portion 303 is an item that can designate an interval of each scanning for multiple times of scanning. The charged particle beam apparatus 1 controls so that the surface of the sample 110 in FIG. 1 is not irradiated with the charged particle beam L1 when the scanning is completed once, and is paused for the interval set by the interval setting portion 303. After that, the charged particle beam apparatus 1 starts the scanning again and repeats the scanning and the pausing, to obtain the scanned image. The resolution setting portion 304 is an item that can designate the resolution of the image obtained by the scanning. The pixel stay time setting portion 305 is an item that can designate the time of irradiation with the charged particle beam L1 per pixel in the image obtained by scanning. The charged particle beam apparatus 1 sets a control signal of the deflection coil 103 so that the scanning can be performed at the time set by the pixel stay time setting portion 305.

Each setting portion in FIG. 3 is described as a combo box as an example of the GUI, but sliders, preset buttons, or the like can also be used as a substitute.

FIG. 4 is an example of a screen displayed on the display device 21 as a user interface for displaying the scanned image of the charged particle beam apparatus 1 of the first embodiment. A feature of this screen is that the scanned image and the graph of environment information are displayed in association with each other. Another feature is that it is possible to display frame feeding in order to check a change in the same field of view. As described above, according to the charged particle beam apparatus 1, the image quality deterioration factor can be monitored.

The screen of "checking of selected state" of FIG. 4 has an image display portion 401, a frame feed button 402, a selecting portion 403, a number display portion 404, a thumbnail display portion 405, a graph display portion 406, a scroll bar 407, and a selection number label 408, a non-selection number label 409, a front-end setting portion 410, a rear-end setting portion 411, an all-select button 412, an all-release button 413, an automatic select button 414, an image integrate button 415.

The image display portion 401 is a portion in which one image among the scanned images is displayed in a size in which the details can be checked. In the illustrated example, the image display portion 401 displays the image #4, and the image display portion 401 is not limited to this, and information that can specify the image may be added. The frame feed button 402 is a button for displaying frame feeding (frames correspond to images). As the frame feed button 402, there are a left arrow button and a right arrow button. The charged particle beam apparatus 1 updates the image of the image display portion 401 so that, when the user presses the left arrow button, the image returns by one frame, and when the user presses the right arrow button, the image advances by one frame. In a case where a sample that is likely to be contaminated is imaged, when a certain number of times of scanning is reached, the contrast of the image is lowered. In order to obtain the target image that is not affected by the contamination, the user updates the image of the image display portion 401 by frame feeding with the frame feed button 402 and checks the timing at which the contrast is lowered. As a result, the user can select the image that is not affected by the sample contamination and, thus, can obtain a desired target image.

The selecting portion 403 indicates a selected state related to the classification of the image and is a control (GUI component) for correcting the selected state determined by the selecting process in step S4. For example, for each image, the one with a check is set as "selected" and the one without a check is set as "non-selected", and when the user presses the selecting portion 403, the check state of the selecting portion 403 is reversed. In the illustrated example, the selected state of #2 and #3 is "selected", and the selected state of #1 and #4 is "non-selected". The number display portion 404 is a portion indicating the order (for example, indicated by #1 or the like) in which the images are acquired. The thumbnail display portion 405 is a portion displaying thumbnails of scanned images side by side in order in which thumbnails of scanned images are acquired.

The graph display portion 406 is a portion displaying the environment information obtained from the imaging device 10 as a graph associated with the image. In the illustrated example, the graph display portion 406 plots the emission current in a square and the degree of vacuum in a circle.

Since the thumbnail display portion 405 arranges the images in order of acquisition, the horizontal axis of the graph display portion 406 represents the time, and the vertical axis represents the numerical value of each environment information.

It is difficult to remove the image quality deterioration factor and maintain a stable state with a high accuracy for both the SEM and the target sample, and actually, the environment information of the imaging device 10 may not be constant. By displaying the environment information in the graph as described above, the user who is the operator can optimize the selected state by referring to the change in the environment information.

The scroll bar 407 is for displaying information that does not fit to the screen of FIG. 4 for the thumbnail display portion 405 and the graph display portion 406 as necessary. The position of the knob on the scroll bar 407 is linked with the display positions of the thumbnail display portion 405, the graph display portion 406, and the like. The thumbnail display portion 405 and the graph display portion 406 are arranged in order of acquisition, and when the user moves the knob to the left, old information is displayed, and when the knob is moved to the right, new information is displayed.

The selection number label 408 indicates the number of scanned images of which selected state is "selected". The number of images used in the integrating process contributes to the suppression of the random noise. For this reason, the user can assume the random noise occurring in the image when the integrated image is obtained before the integrating process by referring to the selection number label 408. The non-selection number label 409 indicates the number of scanned images of which the selected state is "non-selected". The user can predict the remaining number of images in which the selected state can be changed from "non-selected" to "selected" by the non-selection number label 409.

The front-end setting portion 410 is an item that can designate the front end of the range that is a target of the integrating process. For example, in some cases, the field of view may drift until a certain number of times of scanning is reached. The user can use the designation of the front end of the range in order to exclude the deteriorated images before reaching a certain number of times of scanning from the target of the integrating process. The rear-end setting portion 411 is an item that can designate the rear end of the range that is the target of the integrating process. For example, in some cases, when a certain number of times of scanning is reached, the image may appear white due to the charging. Alternatively, in some cases, the contrast may be lowered due to contamination. The user can use the designation of the rear end of the range in order to exclude the deteriorated images after reaching a certain number of times of scanning from the target of the integrating process.

The all-select button 412 is a button that can update the selected states at once. When the user presses the all-select button 412, the charged particle beam apparatus 1 sets all the selected states displayed on the selecting portion 403 to "selected". The all-release button 413 is a button that can update the selected states at once. When the user presses the all-release button 413, the charged particle beam apparatus 1 sets all the selected states displayed on the selecting portion 403 to "non-selected". The automatic select button 414 is a button that can update the selected states at once. When the user presses the automatic select button 414, the charged particle beam apparatus sets the selected state to "non-selected" for the images including the deteriorated image and sets the selected state to "selected" for the images not including the deteriorated image by the selecting process. The process is the same as that in step S4 of FIG. 2, and is used for returning the selected state.

The image integrate button 415 is a button that can execute the image integration. When the user presses the image integrate button 415, the charged particle beam apparatus 1 newly acquires a selected state ID (information for managing the selected state recorded in the selected state DB described later) and updates the selected state of the selecting portion 403. However, a range outside the range from the front-end image of the front-end setting portion 410 to the rear-end image of the rear-end setting portion 411 is set to "non-selected". The charged particle beam apparatus 1 shifts the process from step S5 to step S6 and executes the integrating process by referring to the selected state DB. In addition, the charged particle beam apparatus 1 closes the screen of FIG. 4 and opens the screen of FIG. 5 at the end of the integrating process.

FIG. 5 illustrates an example of a screen displayed on the display device 21 as a user interface for displaying the integrated image of the charged particle beam apparatus 1 of the first embodiment. The feature of the screen is that the image quality evaluation index value is displayed in a graph as an index to determine the image quality, and thus, the image quality can be evaluated quantitatively, and furthermore, the reference data is recorded and compared so that the image quality can be evaluated relatively. The reference data is an integrated image generated from the same scanned image by changing the selected state and an image quality evaluation index value of the integrated image, and a data used as a reference for determining the image quality. The image quality evaluation index value will be described as an example when a line profile, sharpness, and granularity are used.

The screen of "display of integrated image" in FIG. 5 illustrates a reference data 501, a generated data 502, a store button 503, an integrated image 504, a profile position 505, a line profile 506, sharpness 507, granularity 508, an update button 509, a re-select button 510, and an end button 511.

The reference data 501 is a display area for setting integrated images having different selected states as a reference data in advance and comparing the integrated images with the generated data 502 described later for evaluation. The charged particle beam apparatus 1 reads the data set as the reference data from the integrated image DB described later and displays the data on each control of the GUI. In addition, when the reference data is not set by the update button 509 described later, the charged particle beam apparatus 1 may set the selected states of all images to "selected" and also set the range that is the target of the integrating process as all images, may generate the integrated image, and may set the generated image as the reference data.

The generated data 502 is a display area for checking whether the integrated image generated in the integrating process in step S6 satisfies the user's request as the target image. The charged particle beam apparatus 1 reads the data generated in the final integrating process from the integrated image DB described later and displays the generated data on each control of the GUI.

The store button 503 is a button that can store the integrated image as the target image. The store button 503 is provided in the reference data 501 and the generated data 502, respectively, and each integrated image can be set as a storage target. For example, by setting the integrated image with a highly evaluated image quality, even when the data generated by the final integrating process does not have sufficient image quality as the target image, the user can store the integrated image having a highly evaluated image quality from the reference data 501 set up to that time as the target image.

The integrated image 504 is an area for displaying the integrated image. In the illustrated example, the integrated image ID is C1 in the reference data 501, and the integrated image ID is C2 in the generated data 502, and thus, information (integrated image ID) that can specify the image is added. In addition, the position for drawing the information that can specify the image may not be on the integrated image 504.

The profile position 505 is a control for designating the position of the line profile 506 described later. In the illustrated example, the profile position 505 is moved up and down to be designated in accordance with raster type scanning which is common in the SEM. As the method for designating the position of the line profile 506, another method for designating the position by mouse dragging or the like can be applied.

The line profile 506 is a graph illustrating the positions of the pixels on the horizontal axis and the grayscale values of the pixels on the vertical axis for the pixels on the line drawn on the integrated image 504. In the illustrated example, the character A shape (black) indicates the minimum value, and conversely, the background area (white) indicates the maximum value. It can be determined that the generated data having a small number of pixels from the maximum value to the minimum value has a higher sharpness. In addition, it can be determined that the generated data having a large difference between the maximum value and the minimum value has a higher contrast.

With respect to the sharpness 507, the evaluation value of the sharpness calculated from the integrated image 504 is displayed in a rod-shaped format. For example, a DR method is used as a method for evaluating the sharpness. If the standard deviation of the intensity distribution of the probe in the SEM is denoted by $\sigma$, the sharpness R is represented by $R=\sqrt{2}\times\sigma$.

With respect to the granularity 508, the evaluation values of the granularities calculated from the integrated image 504 are displayed in a rod-shaped format. For example, RMS granularity is used as a method for evaluating granularity. In this case, the granularity is represented by the following mathematical formula 1.

[Mathematical Formula 1]

grayscale value of each pixel: $D_i$     Mathematical Formula 1 mean value of grayscale values: $\overline{D}$ granularity: $RMS$ $$RMS = \sqrt{\frac{1}{n-1}\sum_{i=1}^{n}(D_i - \overline{D})}$$

The update button 509 is a button that can update the reference data 501. When the user presses the update button 509, the charged particle beam apparatus 1 sets the later-described integrated image ID associated with the generated data 502 to the later-described integrated image ID associated with the reference data 501.

The re-select button 510 is a button that can allow the process to return to step S5. When the user presses the re-select button 510, the charged particle beam apparatus 1 closes the screen of FIG. 5 and displays the screen of FIG. 4 again. For example, when the user recognizes the deterioration in image quality of the integrated image generated in the integrating process instep S6, the re-select button 510 can be used to change the selected state and generate the integrated image again.

Herein, although the user is allowed to determine the presence or absence of the deterioration in image quality, the processor 201 may be allowed to determine the presence or absence of the deterioration in image quality without the intervention of the user's determination. For example, in a case where the image quality evaluation index value is improved by 20% or more by comparing a reference integrated image, which is an image obtained by selecting all of a plurality of images (scanned images) and integrating the images, with the current integrated image, the processor 201 assumes that the integrated image has no deterioration in image quality, and the processing flow is ended.

In addition, for example, the following processes may be performed. The processor 201 generates the integrated image by selecting all of the plurality of images and integrating the images without depending on the operation of the user, and the processor 201 generates each integrated image according to each pattern in which each image is selected or non-selected from the plurality of images. The processor 201 evaluates the image quality by comparing the plurality of integrated images. The processor 201 stores the integrated image selected from the plurality of integrated images based on a result of the evaluation, and ends the processing flow.

The end button 511 is a button that can close the screen of FIG. 5 to end the processing flow of the imaging function for preventing the deterioration in image quality including the selecting process by the computer 20 of the charged particle beam apparatus 1 of the first embodiment.

Database

FIG. 6 illustrates a database provided in the charged particle beam apparatus 1 of the first embodiment. The database is configured with a scanned image DB 610, a selected state DB 620, and an integrated image DB 630.

The scanned image DB 610 is a database for associating the scanned image, information including the environment information obtained from the imaging device 10 each time of the scanning, and the management information with one another and has the following attributes. The scanned image DB 610 has a scanned image ID 611, a number 612, an image file 613, imaging timing 614, a probe current 615, and a degree of vacuum 616.

The scanned image ID 611 is information for managing the scanned image. In step S1 of FIG. 2, the charged particle beam apparatus 1 allocates a new unique value and sets the allocated value as the scanned image ID 611 which is a key for specifying the scanned image. With this key, the scanned image is associated with the selected state DB 620. The number 612 is the order in which the image is obtained. The number 612 is the management information for specifying the image obtained in one-time scanning among the scanned images. The charged particle beam apparatus 1 allocates the counted-up value every time the image is obtained in step S2 and sets the value as the number 612. The selected state DB 620 also has the same attributes. The image file 613 is each image (scanned image) obtained in step S2. In the illustrated example, the image file 613 is not the actual state of the image but the path information of the file which is the information of the storage destination in the recording medium. The present invention is not limited to this, but the image file 613 may be the actual state of the image or a compressed version thereof.

The imaging timing 614 indicates the time when the image is obtained. In the illustrated example, the imaging timing 614 indicates the timing at which each of images (scanned images) obtained by scanning the same area multiple times with the first image obtained as a reference (0) as an elapsed time. The present invention is not limited to this, but the imaging timing 614 may be represented by the time. The probe current 615 is a current amount of the charged particle beam L1 with which the charged particle beam apparatus 1 of FIG. 1 irradiates the sample 110. The probe current 615 can be calculated from the control values of the electron gun 101, the condenser lens 102, the objective lens 104, and the like. The degree of vacuum 616 is the atmospheric pressure in the sample chamber that is evacuated by the vacuum pump 107. The degree of vacuum 616 can be measured by the environmental sensor 108 installed in the sample chamber.

The imaging timing 614, the probe current 615, and the degree of vacuum 616 are examples of environment information when the image is acquired by the imaging device 10. For example, when the probe current 615 decreases, a signal amount of the secondary electrons L2 decreases, and the image becomes dark. Alternatively, when the degree of vacuum 616 is lowered, the condensed charged particle beam L1 is scattered by the atmosphere, and the image is blurred. In this manner, the environment information related to the image quality can be used for the selecting process. For this reason, the charged particle beam apparatus 1 records the environment information in the database in association with the image. When the imaging device 10 has other environment information related to the image quality, the charged particle beam apparatus 1 adds the corresponding items to the attributes of the environmental sensor 108 and the scanned image DB 610 and records the items.

The selected state DB 620 is a database for associating the selected state related to the above-mentioned classification with the management information and has the following attributes. The selected state DB 620 has a selected state ID 621, a scanned image ID 611, a number 612, and a selected state 622.

The selected state ID 621 is information for managing the selected state. In step S4 of FIG. 2, the charged particle beam apparatus 1 allocates a new unique value in the execution of the selecting process and sets the unique value as the selected state ID 621 which is a key for specifying the selected state. In step S5, the charged particle beam apparatus 1 allocates a new unique value when the correction of the selected state is determined. For this reason, there may be a plurality of the selected state IDs 621 for the scanned image ID 611. With the selected state ID 621, the scanned image is associated with the integrated image DB 630. The selected state 622 has, as a state, "selected" indicating the input of the integrating process or "non-selected" indicating that the integrating process is not input, and each state may be represented by a discriminable value. In the illustrated example, "selected" is set to 1 and "non-selected" is set to 0.

The integrated image DB 630 is a database for associating the integrated image, the image quality evaluation index value for evaluating the integrated image, and the management information with one another and has the following attributes. The integrated image DB 630 has an integrated image ID 631, a selected state ID 621, an image file 632, a line profile 633, a sharpness 634, and a granularity 635.

The integrated image ID 631 is information for managing the integrated image. Instep S6 of FIG. 2, the charged particle beam apparatus 1 allocates a new unique value and sets the unique value as the integrated image ID 631 which is a key for specifying the integrated image. The image file 632 is an integrated image obtained in step S6. In the illustrated example, the image file 632 is not the actual state of the image but the path information of the file which is the information of the storage destination in the recording medium. The present invention is not limited to this, but the image file 632 may be the actual state of the image or a compressed version thereof.

The line profile 633 is a set of numerical strings based on the grayscale values. In the illustrated example, the line profile 633 is not the actual state of the set but the path information of the file which is the information of the storage destination in the recording medium. The present invention is not limited to this, but the line profile 633 may be the actual state of the set or a compressed version thereof. The sharpness 634 is a calculated index value of the sharpness. The granularity 635 is a calculated index value of the granularity.

The line profile 633, the sharpness 634, and the granularity 635 are the image quality evaluation index values for evaluating the integrated image. For example, when it is difficult to evaluate an edge of a structure by visual inspection of the image, it may be possible to evaluate the edge of the structure by using the line profile. If there is another image quality evaluation index value suitable for determining the image quality, the attribute is added and recorded in the integrated image DB 630. If necessary, a control that can display the attributes as a graph in correspondence with the added image quality evaluation index value is added to the screen of FIG. 5.

Data flow in Imaging Function

FIG. 7 illustrates a database in the imaging function for preventing a deterioration in image quality of the charged particle beam apparatus 1 of the first embodiment and a data flow illustrating the relationship between the selecting process and the integrating process.

Environment information 701 is a set data of the imaging timing 614, the probe current 615, and the degree of vacuum 616 recorded in the scanned image DB 610. A scanned image 702 is a set data of the image files 613 recorded in the scanned image DB 610. A non-selected image 703 is a set data of the image files in which the selected state 622 recorded in the selected state DB 620 is "non-selected" (0). A selected image 704 is a set data of the image files in which the selected state 622 recorded in the selected state DB 620 is "selected" (1). The integrated image 705 is one of the image files 632 recorded in the integrated image DB 630.

The selecting process 706 corresponds to step S4 in FIG. 2 and is executed by the processor 201. The selecting process 706 is a process of inputting the environment information 701 and the scanned image 702 and performing classification into two images of the selected image 704 which is an image required to generate the target image and the non-selected image 703 which is an image not required to generate the target image. Herein, the image required to generate the target image refers to the scanned image 702 that does not include the deteriorated image. In the first embodiment, unsupervised machine learning is applied to the selecting process 706 in order to automatically classify a given data set without criteria such as thresholds. For example, in the unsupervised machine learning, a k-means method is applied. In the k-means method, the average of clusters is used, and clusters can be classified into a given number of clusters k. First, the computer 20 sets two clusters at random, allows each of the scanned images 702 to belong to the cluster having a higher similarity, and sets the center of gravity of each cluster to the cluster. The computer 20 again allows each of the scanned images 702 to belong to the cluster having a higher similarity and sets the center of gravity of each cluster to the cluster. By repeating the process, the computer 20 allows the scanned images to converge on two clusters having similar properties, and sets the two clusters to the selected image 704 and the non-selected image 703. The degree of similarity and the center of gravity can be calculated from the feature quantities obtained from each of the scanned images.

In addition, when a plurality of the image quality deterioration factors occur, an extended algorithm of the k-means method is used. This extended algorithm is a method of automatically estimating the number of clusters for the distribution of all defined feature spaces. In the method, each of the obtained scanned images 702 is classified only by the features corresponding to the occurring image quality deterioration factors, and the cluster including the reference image among the three or more classified clusters is set to the scanned image 702 which does not include the deteriorated image. The computer 20 stores the time from the start of step S2 to the stabilization of the imaging device 10 as a parameter and uses the image obtained at the timing of the stabilization as the reference image. Alternatively, the user may designate the reference image by the GUI.

For example, when a certain number of times of scanning is reached, in some cases, the entire image may become white due to the charging. Alternatively, the entire image may become black due to the contamination. Due to these phenomena, the contrast of the image obtained by one-time scanning is lowered. For this reason, by the k-means method using the contrast as a feature quantity, it is possible to classify the image in which the contrast is maintained and the image in which the contrast is lowered.

Figure 8B:
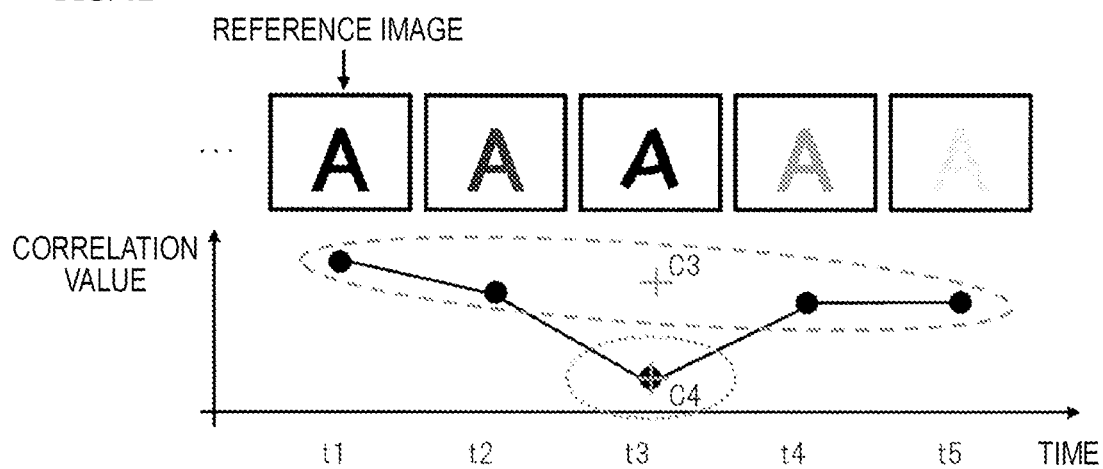

On the upper side of (a) of FIG. 8, the scanned images are arranged at the acquired times t1 to t5, and the time at which the scanned images are acquired is the time t5. On the lower side, a graph illustrating the contrast calculated from the arranged images on the vertical axis is illustrated. Looking at the transition of the scanned image, the structure that is black at time t1 to t3 (the structure having the letter A shape in the example) gradually becomes white from the time t4. In this graph, the transition in which the contrast is lowered from the time t4 is illustrated, and the clusters can be classified into two clusters indicated by the cluster C1 and the cluster C2 by the k-means method using the contrast as a feature quantity. It is noted that the cross mark represents the center of gravity of each cluster, and the ones belonging to the cluster are surrounded by broken lines. In the illustrated example, the image acquired at the time t1 is used as the reference image, and the cluster C1 including the reference image can be determined as the scanned image that does not include the deteriorated image. As described above, according to the first embodiment, the contrast that fluctuates every time the scanned image is obtained can be classified without setting the threshold or the like.

In addition, in a case where the image is distorted due to vibration by the time the scanning is completed, the correlation value between each image and the image of which structure is grasped without the distortion in the scanned image is used as the feature quantity, and the images can be classified into images that resemble a structure without distortion and images that are distorted by the k-means method.

(b) of FIG. 8 illustrates a correlation value on the vertical axis of the graph in (a) of FIG. 8. The correlation value at time t1 is the maximum value because of the correlation of the same image. The correlation values at time t2, time t4, and time t5 are about the same because there is no distortion in the structure. Since only the structure at time t3 is distorted, the correlation value is lowered, and thus, the clusters can be classified into two clusters of a cluster C3 and a cluster C4 by the k-means method using the correlation value as a feature quantity. In the illustrated example, the image acquired at time t1 is used as the reference image, and thus, the cluster C3 including the reference image can be determined to be the scanned image that does not include the deteriorated image.

In the above example, the feature quantity is obtained from the information included in the image obtained by one-time scanning, but the imaging timing 614, the probe current 615, the degree of vacuum 616, and the like included in the environment information 701 may be defined as the feature quantity. Similarly, the relationship between the image and the environment information obtained in one-time scanning and the image and the environment information obtained in the next one-time scanning, for example, a differential value of the probe current may be defined as the feature quantity.

As described above, the processor 201 uses the machine learning in which the features suitable for each image quality deterioration factor are defined in the selecting process 706 of FIG. 7, so that only the scanned images 702 that do not include the deteriorated image can be set as the selected images 704.

The integrating process 707 of FIG. 7 corresponds to step S6 in FIG. 2 and is executed by the processor 201. The integrating process 707 inputs the selected image 704 and outputs the integrated image 705. The integrating process 707 integrates the grayscale values for each pixel with respect to the set data of the input images and sets the integrated grayscale values as the grayscale values of the corresponding pixels of the integrated image 705. Accordingly, the integrated image 705, which is the target image in which random noise is suppressed, can be obtained. The integrating process 707 is not limited to this, and normalized integration described in PTL 1 can also be applied.

In addition, the integrating process 707 includes integrating the grayscale values for each pixel while position-aligning the images, which is called a drift correcting process described in PTL 2. In the imaging function for preventing the deterioration in image quality, when the image is position-aligned with an erroneous position by the drift correcting process, the charged particle beam apparatus 1 can improve the accuracy by changing the selected state 622 of the image that causes the erroneous position in step S5 of FIG. 2 and removing the image from the input of the integrating process 707.

Second Embodiment

A charged particle beam apparatus of a second embodiment of the present invention will be described with reference to FIGS. 9 and 10. A basic configuration in the second embodiment is the same as that in the first embodiment, and components different from the first embodiment in the second embodiment will be described below. The charged particle beam apparatus of the second embodiment has an observation function of which image selection and image integration are applied to the observed image of the sample 110 (FIG. 1) currently being observed by the user, in addition to the observation function in the related art. As a result, a deterioration in image quality of the observed image displayed on a monitor (display device 21) is prevented.

Data Flow in Observation Function

FIG. 9 illustrates a data flow as a configuration of the charged particle beam apparatus of the second embodiment, which is a difference from the charged particle beam apparatus 1 of the first embodiment. In the second embodiment, environment information 701, a scanned image 702, and an integrated image 705 of FIG. 9 are not set data but current (latest) values or images in order to illustrate the observation function that is updated in real time. For example, in the environment information 701, the current acquired value is indicated by a black frame, and the past acquired value is indicated by a gray frame. Then, in the second embodiment, since the above-mentioned integrated image 705 of FIG. 7 is updated in real time as the observed image, it is not necessary to store the image before the update in the database for a long period of time. Furthermore, in the data flow in the observation function in the second embodiment, since displaying the observed image, setting the conditions on the imaging device 10, and the like are requested to the user, correlation among the computer 20, the display device 21, and the operating device 22 is added.

The selecting process 901 of FIG. 9 has the same role as the selecting process 701 of the first embodiment to classify the images into the scanned images 702 that does not include a deteriorated image and images other than the scanned image 702. In order to classify one current scanned image 702 in the observed image of which various fields of view can be dynamically taken, the past scanned image 702 and the correct selected state 622 are required. Therefore, the charged particle beam apparatus of the second embodiment applies the supervised machine learning that learns the learning data DB 903 described later in advance and classifies the learning data DB 903 based on the past scanned image 702 to the selecting process 901. For example, in the supervised machine learning, a method using convolutional neural network (CNN) is applied. In the method, the CNN is used to find features from data of the images and the like and classify the features according to the supervision. In this case, in the selecting process 901, one grayscale value of the current scanned image 702 is input, and outputs are obtained from the units corresponding to the selected image 704 and the non-selected image 703. In the CNN learning, one grayscale value of the past scanned image 702 is input in order, and the weight is updated based on an error between the output from the obtained unit and the output from the unit corresponding to the correct selected state 622. By repeating the CNN learning, the CNN learning can find features from the images and classify the selected image 704 and the non-selected image 703. It is noted that the unit corresponding to the non-selected image 703 may exist for each image deterioration factor.

The integrating process 902 of FIG. 9 has the same role as the selecting process 701 of the first embodiment to obtain the integrated image 705 in which random noise is suppressed from the selected image 704. In the observed image of which various fields of view can be dynamically taken, if the same processing as in the first embodiment is performed when the set data of the images having different fields of view is obtained, the responsiveness is impaired. Therefore, a filter that simulates persistence characteristics of a phosphor, which is generally called a recursive filter, is applied. This is a method of integrating the grayscale values of pixels by changing the specific weight so that the newer the image, the larger the specific weight. Accordingly, the integrated image 705 in which random noise is suppressed without impairing the responsiveness can be obtained.

The learning data DB 903 is a DB having data in the same format as the selected state DB 620. The learning data DB 903 associates the correct selected state 622 with the past scanned image 702 by the error correction 904 described later. In order to improve the accuracy, the learning data DB 903 may be divided according to the sample 110 observed by the imaging device 10, the optical conditions determined by the deflection coil 103, the type of the detector 105, and the like. In this case, the machine learning that is learned under matching conditions among the divided learning data DB 903 is used for the selecting process 901.

The error correction 904 is executed in a stopped state after using the observation function for preventing the deterioration in image quality of the second embodiment. The process of the error correction 904 is executed based on the operation of correcting the error by the user. The charged particle beam apparatus inputs the non-selected image 703 and the selected image 704 of the selected state DB 620 added during the use of the observation function, corrects the selected state 622 having an error due to user input from the operating device 22 or the like, and performs addition to the learning data DB 903. Every time the observation function of the second embodiment is restarted after performing the error correction 904, the learning data DB 903 is accumulated, and thus, it can be expected that the accuracy and versatility will be improved.

In addition, by inputting the non-selected image 703 and the selected image 704 of the selected state DB 620 added during use of the observation function, the work of creating the learning data DB 903 only corrects the selected state 622 having an error. That is, according to the second embodiment, it can be expected that the work of creating the learning data DB 903 will be reduced although the work depends on the accuracy of the integrating process 902.

GUI in Observation Function

FIG. 10 illustrates an example of a screen displayed on the display device 21 as a user interface for the error correction 904 of FIG. 9 in the charged particle beam apparatus of the second embodiment. The "error correction" screen of FIG. 10 includes a selected image field 1001, a non-selected image field 1002, an image display portion 1003, a correction portion 1004, a number display portion 1005, an update button 1006, and a cancel button 1007.

The selected image field 1001 is a field for listing and displaying the input selected images 704 (FIG. 9). The non-selected image field 1002 is a field for listing and displaying the input non-selected image 703 (FIG. 9). The image display portion 1003 is an area for displaying each image which is a non-selected image 703 or a selected image 704.

The correction portion 1004 is a portion where the user can input a correction for an error in the selected state of the image. For example, a cross mark (x) in the correction portion 1004 indicates that the selected state is corrected because the selected state is erroneous, and a non-mark indicates that the selected state is not corrected. When the user presses the correction portion 1004, the cross mark and the non-mark are reversed. In the illustrated example, the images of #5 and #6 are in the state where the correction portion 1004 is the cross mark, which indicates that the images are to be corrected. The number display portion 1005 indicates the order in which the images are acquired.

The update button 1006 is a button that can update the learning data DB 903 of FIG. 9 with a new data. When the user presses the update button 1006, the charged particle beam apparatus duplicates the data not added to the learning data DB 903 from the selected state DB 620 and corrects the selected state 622 according to the state of input to the correction portion 1004. The charged particle beam apparatus adds the created data to the learning data DB 903 and closes the screen of FIG. 10. When updating the learning data DB 903, the charged particle beam apparatus may display the screen for setting the category for division according to the sample 110 observed by the imaging device 10, the optical conditions determined by the deflection coil 103 or the like, and the type of the detector 105, and the like and prompt the user to input. The cancel button 1007 is a button that can cancel the update. When the user presses the cancel button 1007, the charged particle beam apparatus closes the screen of FIG. 10 without updating the learning data DB 903.

Observation Function to Prevent Deterioration in Image Quality

With respect to the charged particle beam apparatus of the second embodiment, it is assumed that, for example, floor vibration due to transportation of a heavy object is transmitted to the imaging device 10. In this case, the position of the probe scanning the sample shifts, and distortion occurs in one image which is the current scanned image 702 (FIG. 9). Herein, in the case of the observation function in the related art, since the integrating process 902 (FIG. 9) to which the recursive filter is applied increases the specific weight of one image which is the current scanned image 702 and integrates the images, the monitor (display device 21) displays the observed image in which the contour of the fine structure is double.

On the other hand, in the case of the observation function to which the image selection and image integration are applied in the second embodiment, the learning data DB 903 is learned in advance, and one image that is the current scanned image 702 can be classified as a deteriorated image based on the past scanned image 702 (FIG. 9). As a result, one image, which is the current scanned image 702, is not the target of the integrating process 902, so that the monitor (display device 21) displays the observed image in which the contour of the fine structure is not double.

When the user who is the operator intends to display the observed image in which the contour of the fine structure is not double, the user performs the switching operation 905 (FIG. 9) to the observation function to which the image selection and image integration in the second embodiment are applied from the observation function in the related art.

When the selected state 622 is merely non-selected by the selecting process 901, since the observed image on the monitor (display device 21) is not updated, the user performs the switching operation 905 from the observation function to which the image selection and image integration are applied to the observation function in the related art. Alternatively, if the selected state 622 is merely non-selected after a certain period of time, the processor 201 may automatically switch from the observation function to which the image selection and image integration are applied to the observation function in the related art.

REFERENCE SIGNS LIST

1: charged particle beam apparatus
10: imaging device
20: computer
201: processor
202: memory
21: display device
22: operating device

The invention claimed is:

1. A charged particle beam apparatus comprising:
an imaging device that irradiates a sample with a charged particle beam and forms an image from information of the sample; and
a computer that is provided with a memory for storing each of images obtained by scanning same area multiple times by using the imaging device and a processor for executing image processing,
wherein the computer classifies each of images obtained by scanning the same area multiple times into image groups by unsupervised machine learning,
sets an image group including a reference image as an image group having no deterioration,
performs image integration on the image group having no deterioration, and
outputs an image obtained by the image integration.

2. The charged particle beam apparatus according to claim 1, further comprising:
an operating device that receives an input of a user; and
a display device that displays a graphical user interface,
wherein the computer
gives identification information for each of the image groups, and
displays the image group and the identification information on a screen of the display device.

3. The charged particle beam apparatus according to claim 2, wherein the computer has a function of re-selecting the image in the image group including the reference image obtained by the classification, based on an operation of a user.

4. A charged particle beam apparatus comprising:
an imaging device that irradiates a sample with a charged particle beam and forms an image from information of the sample;
a computer that is provided with a memory for storing each of images obtained by scanning same area multiple times by using the imaging device and a processor for executing image processing;
an operating device that receives an input of a user; and
a display device that displays a graphical user interface,
wherein the computer classifies each of images obtained by scanning the same area multiple times into images having deterioration and images having no deterioration by supervised machine learning,
performs image integration on the images having no deterioration,
outputs an image obtained by the image integration,
displays information for performing error correction related to the supervised machine learning on a screen of the display device, and
performs the supervised machine learning using the image having deterioration and the image having no deterioration obtained in the past as inputs based on an operation of the user on the screen or based on a determination by a model of the machine learning.

5. A charged particle beam apparatus comprising:

an imaging device that irradiates a sample with a charged particle beam and forms an image from information of the sample; and a computer that is provided with a memory for storing each of images obtained by scanning same area multiple times by using the imaging device and a processor for executing image processing, wherein the computer classifies each of images obtained by scanning the same area multiple times into images having deterioration and images having no deterioration, performs image integration on the images having no deterioration, and outputs an image obtained by the image integration, and wherein the computer evaluates an image quality by comparing an integrated image generated by selecting all of the images obtained by scanning the same area multiple times and performing image integration without depending on an operation of the user and each integrated image generated by performing image integration according to each pattern in which each image is selected or non-selected, and outputs the integrated image selected from the plurality of integrated images based on the evaluation.

6. The charged particle beam apparatus according to claim 5, wherein the computer switches off a function of performing the image integration by the supervised machine learning if the classification of the image having deterioration and the image having no deterioration is not updated for a certain period of time.

* * * * *